US006214312B1

(12) United States Patent
Kolenda et al.

(10) Patent No.: US 6,214,312 B1
(45) Date of Patent: *Apr. 10, 2001

(54) PROCESS FOR SYNTHESISING ALUMINAS IN A BASIC MEDIUM (75) Inventors: Frédéric Kolenda, Francheville le Haut; Jean-Louis Guth, Mulhouse, both of (FR); Sabine Valange, Eignon; Zélimir Gabelica, Warenne-Oleye, both of (BE); Sylvie Lacombe, Rueil Malmaison (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/357,824

(22) Filed: Jul. 21, 1999

(30) Foreign Application Priority Data

Jul. 22, 1998 (FR) ................................. 98 09390

(51) Int. Cl.⁷ ...................................... C01F 7/02
(52) U.S. Cl. ...................... 423/628; 423/626; 423/630; 423/631
(58) Field of Search .................. 423/626, 628, 423/630, 631

(56) References Cited

U.S. PATENT DOCUMENTS

| 4,579,729 | | 4/1986 | Schoenthal et al. | 423/626 |
| 5,695,735 | * | 12/1997 | Benazzi et al. | 423/700 |
| 5,800,797 | * | 9/1998 | Matsumoto et al. | 423/626 |
| 6,027,706 | * | 2/2000 | Pinnavaia et al. | 423/630 |

FOREIGN PATENT DOCUMENTS

| 0 670 286 | | 9/1995 | (EP) . |
| 670286 | * | 9/1995 | (EP) . |
| 0 714 851 | | 6/1996 | (EP) . |
| 0 775 520 | | 5/1997 | (EP) . |
| 96/39357 | | 12/1996 | (WO) . |

OTHER PUBLICATIONS

Vaudry et al., "Synthesis of Pure Alumina Mesoporous Materials," *Chem. Mater.* 1996, vol. 8, 1451–1464.
Yada et al., "Synthesis and deorganization of an aluminium–based dodecyl sulfate mesophase with a hexagonal structure," *Chem. Commun.*, 1996, XP–002075632, pp. 769–770.
Stein et al., "Aluminum–Containing Mesostructural Materials," *Journal of Porous Materials*, vol. 3, 83–92 (1996).
Huo et al., "Organization of Organic Molecules with Inorganic Molecular Species Into Nanocomposite Biphase Arrays," *Chem. Mater.*, 1994, 6, No. 8, 1176–1191.
Tanev et al., "A Neutral Templating Route to Mesoporous Molecular Sieves" *Science,* vol. 267, No. 5199, Feb. 10, 1995, pp. 865–867.
English Abstract of EP 0 670 286 no date.

* cited by examiner

*Primary Examiner*—Steven Bos
(74) *Attorney, Agent, or Firm*—Millen, White, Zelano & Branigan, P.C.

(57) ABSTRACT

The invention concerns a process for synthesising aluminas with a controlled porosity in which the pore diameter is in the range 0.6 nm to 80 nm. This process is carried out in a plurality of steps including at least one step a) in which an alumina precursor is prepared by hydrolysis of at least one anionic inorganic source of aluminium in the presence of at least one surfactant. Step a) of the process is carried out in an essentially aqueous medium the pH of which is generally higher than the isoelectric point of the alumina. The process of the invention also comprises at least one step b) in which the precipitate obtained is dried in air at a temperature of about 40° C. to 110° C. for a period of about 2 to 30 hours, and at least one step c) in which the dried precipitate is calcined at a temperature which is sufficient to eliminate the molecules of surfactant present in the precursor.

8 Claims, 14 Drawing Sheets

PROCESS FOR SYNTHESISING ALUMINAS IN A BASIC MEDIUM

FIELD OF THE INVENTION

The invention relates to the field of aluminas with a controlled porosity and to a process for synthesising aluminas with a controlled porosity in a basic medium.

BACKGROUND OF THE INVENTION

Such materials are characterized by their pore volume, their specific surface area and their X ray diffraction spectrum. These materials have a high adsorbent capacity, and are usually used as catalyst supports, adsorbents, or separation means.

The preparation of oxides with a controlled porosity is based on the fact that organic molecules which are classified as surfactants can associate together, in particular when they are placed under controlled porosity oxide synthesis conditions. They then form micelles which have surface electrical charges and a variety of geometries depending on the conditions of the synthesis medium.

Such micelles can then structure polymeric species of mineral oxides such as silica, alumina or other metals such as titanium about them, and thus generate a solid mesoporous network.

International patent WO 96/39357 describes a complementary route using non-ionic surfactants such as polyethylene oxides and neutral precursors of inorganic oxides as sources of the reactants. Such a synthesis is carried out in an organic solvent. This method enables the surfactant to be eliminated readily. Porous inorganic oxides are prepared from non-ionic surfactants using that method.

Studies primarily aimed at controlled hydrolysis of organic $Al(OR')_3$ type aluminium precursors, where R' is a linear or branched alkyl group containing 1 to 5 carbon atoms, highlighted the case where the structuring agent is a quaternary ammonium type, where the medium is a mixed water-alcohol type, and the case where the structuring agent is a micellar type, the reaction then being carried out in an organic solvent. Vaudry and Davis in Chem. Mater., 1996, p. 1451 used fatty acid type surfactants. S. Bagshaw, T. J. Pinnavaia, in Mesoporous alumina molecular sieves, Angew. Chem. Intl. Ed. Engl. 1996, 35; 10, p. 1102–1105 described the production of lamellar phases.

When the structuring agent is a quaternary ammonium type $R_4N^+$, the X ray diffraction diagram generally exhibits a single diffuse diffraction below $2\theta=5°$ (CuK$\alpha$), indicating the presence of a mesostructure with a periodic short range order. With micellar surfactants, the X ray diffraction diagram generally exhibits a peak corresponding to an interplanar distance which is strictly over 3 nanometers indicating a periodic arrangement with a longer range order.

A mesoporous alumina with a hexagonal structure has been synthesised from $Al^{3+}$ species in the presence of sodium dodecyl sulphate; that synthesis has been described by M. Yada, M. Machida, T. Kijima in: "Synthesis and deorganization of an aluminium-based dodecyl sulphate mesophase with a hexagonal structure", Chem. Commun., 1996, 769–770. That method requires the use of large quantities of urea the decomposition of which leads to a slow increase in the pH during prolonged heating. Thus the $Al^{3+}$ cations are hydrolysed, which enables them to polycondense to a lamellar phase then to a hexagonal phase when the pH is above 7. That structure is preserved after calcining the unwashed product but no mention was made of the existence of controlled porosity.

A. S. Stein, B. Holland, in "Aluminium-containing mesostructural materials", J. Porous Materials, 1996, 3, 83–92 synthesised an alumina from Keggin type polycations based on $Al_{13}$ aluminium in the presence of dodecyl sulphate. However, after heat treatment to eliminate the surfactant, the solid obtained had a very low specific surface area of 18 $m^2/g$, obtained using the BET method.

In the present description, the abbreviation "nm" will be used for "nanometer", i.e., $10^{-9}$ meters.

SUMMARY OF THE INVENTION

The invention relates to a process for synthesising aluminas with a controlled porosity such that the pore diameter is in the range 0.6 nm to 80 nm.

This process is carried out in a plurality of steps including at least one step a) in which an alumina precursor is prepared by hydrolysis of at least one anionic inorganic source of aluminium in the presence of at least one surfactant. Step a) of the process is carried out in an essentially aqueous medium the pH of which is generally above the isoelectric point of the alumina. The process of the invention also comprises at least one step b) in which the precipitate obtained is dried in air at a temperature of about 40° C. to about 110° C. for a period of about 2 to 30 hours, and at least one step c) in which the dried precipitate is calcined at a temperature which is sufficient to eliminate the molecules of surfactant present in the precursor. Hydrolysis of the inorganic aluminium source is generally carried out with a compound having an acid function.

The present invention also relates to aluminas with a controlled porosity with a pore diameter in the range 0.6 nm to 80 nm; this invention also relates to the hydrated (as-synthesised) compound obtained before calcining.

The advantages of the process of the invention include: carrying out the process with inorganic sources of aluminium which are cheaper and easy to use, in a low pollution and low cost medium where the main and only solvent is water.

The porosity of the materials can be controlled using the following principal parameters: the nature of the inorganic aluminium source; the nature of the surfactant or surfactants; and the nature of the optional organic compounds used as additives—the role of these additives is to modify the surfactants—; the nature and quantity of the pH modifier; the pH of the medium at which the precursor is formed; and the calcining procedure used to eliminate the surfactants. These principal parameters are not the only factors; temperature, duration of formation of the precursor can also have an effect on the characteristics of the final porosity.

In step a) of the synthesis process of the invention, at least one anionic inorganic aluminium source is reacted with at least one surfactant.

The reaction is carried out at a pH which is above the isoelectric point of alumina and less than 14. However, depending on the concentration and nature of the different species in solution, in some cases it will be necessary to operate at a pH which is substantially higher than the isoelectric point, while in other cases it will be appropriate to be slightly to one side of that isoelectric point to carry out the synthesis in accordance with the process of the present invention. Thus, depending on the case, the minimum pH of the synthesis medium can be in the range 8 to 10.

The inorganic aluminium source is introduced into the mixture in the anionic form $I^-$; the surfactants are cationic $S^+$and/or non ionic, S. If the solution contains at least cationic surfactants $S^+$, anionic surfactants $S^-$ can optionally be added, the quantity of anionic surfactants added generally being such that the total charge of the surfactant mixture does not become negative, the charge on the inorganic surface remaining negative, to follow an $S^+I^-$ type mechanism. However, depending on the pH of the solution and in particular when the pH is close to the isoelectric point, the positive charges on the surface of the aluminium source $I^+$ can become the majority species, and the micelles can then produce $S^+X^-I^+$ type interactions where $X^-$ is the compensating anion of the surfactant present in the synthesis medium.

Without wishing to be bound by any particular theory, the surfactants can be considered to control the polycondensation of inorganic precursors by multiple interactions such as covalent S—I interactions, ionic hydrogen bond $S^°I^°$type interactions, interactions between charged species $S^-I^+$ and $S^+I^-$. These interactions depend on the nature of the surfactants and the pH of the aqueous medium. The interactions are mainly $S^+I^-$ type if cationic surfactants are used, and S—I or $S^°I^°$ interactions can be added to these electrostatic interactions if non ionic surfactants are associated with the preceding micelles. It is also possible to control polycondensation by interactions which are uniquely $S^°I^°$ type (or S—I) using non ionic surfactants. When cationic surfactants $S^-$ are added, $S^-I^+$ type interactions are also present. If the pH is close to the isoelectric point, $S^+X^-I^+$ type interactions can also be present.

The process of the invention is carried out in a mainly aqueous medium the pH of which preferably encourages the formation of negative charges on the surface of the inorganic material which are in the majority over the positive charges, these negatively charged surfaces preferably being obtained in the presence of micelles which are positive overall, the sum of the interactions between the charged species $S^+I^-$ usually being higher than the sum of the interactions between the $S^-I^+$ charged species. The pH of the reaction medium is generally in the range 8 to 14, preferably in the range 9 to 13, more preferably in the range 9 to 12.

In step c), after having dried the precipitate obtained in step a) during step b), calcining is carried out at a temperature which is sufficient to eliminate the molecules of surfactant present in the precursor, the calcining temperature generally being about 400° C. to 600° C. The calcining step is preferably carried out by gradually increasing the temperature over a period of about 2 to 6 hours up to the calcining temperature then maintaining the calcining temperature for a period of 1 to 4 hours in an inert atmosphere, for example nitrogen. Calcining can also be carried out by flash calcining at a temperature of about 400° C. to 600° C. in a medium which contains oxygen, for example air.

The product obtained by the process of the invention has the following characteristics: a controlled porosity such that the pore diameter is in the range 0.6 nm to 80 nm; a specific surface area, measured using the BET method, generally of about 100 to 1000 m$^2$/g, preferably about 350 to 800 m$^2$/g; and a total pore volume which is generally in the range 0.05 to 3.00 cm$^3$/g.

The invention also more particularly relates to aluminas with a controlled porosity; the pore diameter is in the range 0.6 nm to 80 nm, and these aluminas have a total pore volume in the range 0.05 cm$^3$/g to 3.00 cm$^3$/g. The distribution of the aluminas of the present invention is such that the average pore size is in the range 0.6 nm to 80 nm, preferably in the range 1.5 nm to 50 nm. These aluminas have a total pore volume in the range 0.05 cm$^3$/g to 3.00 cm$^3$/g, preferably in the range 1.00 cm$^3$/g to 3.00 cm$^3$/g and more preferably in the range 1.00 cm$^3$/g to 2.00 cm$^3$/g.

Further, the aluminas of the present invention are characterized by an X ray diffraction diagram with an intense signal situated at a displacement corresponding to a diffraction angle 2θ (theta) of less than 5°.

Step a) of the synthesis process of the invention in which at least one anionic inorganic aluminium source is reacted with at least one surfactant, generally in the presence of a compound with an acid function, can also be carried out in the presence of one or more organic compounds. More particularly, when using a micellar surfactant, these organic compounds act to modify the characteristics of the micelles—their shape and dimensions. They are essentially non polar or slightly polar molecules the insertion of which into the hydrophobic portion of the micelles or into the region separating the hydrophilic portion from the hydrophobic portion of the micelles modifies their diameter and their radius of curvature.

In general, the process of the invention is carried out as follows: an aqueous solution A containing at least one cationic surfactant and/or at least one non ionic surfactant is prepared. An anionic inorganic aluminium source is added to this solution A, this inorganic source possibly being in the form of a solution B or in the form of a powder.

When solution A contains at least one cationic surfactant, at least one anionic surfactant can optionally be added such that the total charge of the mixture of surfactants does not become negative. Depending on the species present, the pH of solution B can be highly basic, and solution A itself generally contains a compound with an acid function which is added in a quantity such that the final mixture has a pH of 8 to 14, preferably in the range 9 to 13, more preferably in the range 9 to 12.

Solution A can also optionally contain an organic compound intended to modify the characteristics of the micelles (shape, dimension) and the solubility of the micelles in the aqueous medium. The aluminate is added to solution A all at once and with vigorous stirring. The precipitate resulting from this mixing is stirred for a period of a few minutes to a few hours, preferably about 15 minutes to 2 hours. During this period, the reaction mixture is maintained under conditions in which the mixture had been produced. The temperature is about 15° C. to 90° C., preferably about 15° C. to 60° C.

The aluminas with a controlled porosity such that the pore diameter is in the range 0.6 nm to 80 nm and with a total pore volume in the range 0.05 cm$^3$/g to 3 cm$^3$/g of the present invention are obtained by the synthesis process of the present invention using a mixture of surfactants; preferably this mixture comprises anionic and cationic surfactants, the cationic surfactants being present in the majority with respect to the anionic surfactants.

The scope of the present invention encompasses adding an acid solution prepared separately in the form of a solution C. This solution C is then added to solution A all at once with vigorous stirring at the same time as solution B (or compound B) or after adding this solution B (or compound B). If the synthesis route includes a solution C, solution A—before addition—contains no compounds with an acid function. This variation of the process of the invention may be suitable when it is not possible to completely dissolve the surfactant or surfactants in solution A in the presence of a solution with an acid function. Other variations of the present invention can be implemented to increase the solubility of the surfactant or surfactants, these variations consisting of heating solution A to a temperature of about 30° C. to 90° C. or of replacing part of the water contained in solution A by at least one organic compound which is miscible with water and in which the surfactant or surfactants is/are more soluble. In all cases the solvent medium remains predominantly aqueous, the quantity of organic compounds being about 0.001% to 20% by weight of the total solvent mass.

After reacting, the precipitate is isolated using a suitable filtration or centrifugation means, the precipitate is then washed with water and dried in air at a temperature of about 40° C. to 110° C. to a constant weight of precipitate. The drying period is usually about 2 hours to 30 hours, preferably about 10 hours to 20 hours. After these treatments, a precursor of the alumina with a controlled porosity is obtained.

The surfactant is contained in the pore network of the alumina precursor. This hydrated solid (as synthesised) is characterized by an X ray diffraction diagram with an intense signal situated at a displacement corresponding to a diffraction angle 2θ (theta) of less than 5°.

The chemical formula of this precursor is as follows:

where 0.01<n<2; 0.001<m<0.2; 0.5<y<6

S is the surfactant and X is the anion supplied by the acidic solution.

Anion X is, for example, at least one anion selected from the group formed by F$^-$, Cl$^-$, SO$_4^{2-}$, PO$_4^{3-}$, NO$_3^-$, or RCOO$^-$ where R is an alkyl group.

This precursor of alumina is then calcined at a temperature which is sufficient to eliminate the structuring agents present in the pore space.

More particularly, compound B—optionally dissolved— is a compound selected from the group formed by alkali metal aluminates such as sodium aluminate or potassium aluminate. The pH of the solution is generally about 10 to 14. The aluminium concentration in solution B is generally in the range 0.01 mol/l to 5 mol/l, preferably in the range 0.1 mol/l to 1 mol/l.

The cationic surfactants which may be present in solution A used in the process of the present invention are generally selected from the group formed by alkylammonium salts, alkylphosphonium salts and alkylsulphonium salts.

The non ionic surfactants which may be present in solution A used in the process of the present invention are generally selected from the group formed by alkylpolyethylene oxides, alkylphenyl-polyethylene oxides, alkylphosphine oxides and alkylamine oxides.

The anionic surfactants which may be present in solution A used in the process of the present invention are generally selected from the group formed by alkylcarbonates, alkylsulphates, alkylsulphonates, alkylphenylsulphonates, alkylphosphates and alkylphosphonates.

The scope of the present invention encompasses using surfactants in which several functions co-exist, either amphoteric surfactants in which anionic and cationic functions coexist, or surfactants in which anionic and non ionic functions co-exist such as C-betain, N-betain, an alkylpolyoxyethylene sulphate or an alkylpolyoxyethylene sulphonate.

The organic compounds which can optionally be added to solution A are generally non polar or slightly polar molecules. Such organic compounds are selected from: alkanes with a chain containing 5 to 20 carbon atoms per molecule, preferably nonane or decane; aromatic hydrocarbons substituted by one or more hydrocarbon groups, preferably mesitylene; aliphatic alcohols with a chain containing 5 to 20 carbon atoms per molecule, preferably n-octanol; or aliphatic amines with a chain containing 5 to 20 carbon atoms pre molecule, preferably hexylamines.

The concentration of the surfactant or surfactants in solutions A depends on their nature, i.e., on their solubility and their critical micellar concentration. When solution A is an aqueous solution, the concentration of surfactants in solution A is generally about 0.01 mol/l to 2 mol/l. When solution A is a mixture of water and an organic compound, the concentration of surfactants in solution A is generally about 0.02 mol/l to 3 mol/l.

The ratio of the number of moles of surfactants to the number of moles of aluminium in the mixture A+B is normally about 0.01 to 1.5, preferably about 0.10 to 0.80.

The compound with an added acid function is preferably selected from the group formed by monovalent mineral or organic acids, for example hydrochloric acid (HCl), nitric acid (HNO$_3$), hydrofluoric acid (HF), or acetic acid (CH$_3$CO$_2$H); divalent mineral or organic acids, for example sulphuric acid (H$_2$SO$_4$); or trivalent acids, for example phosphoric acid (H$_3$PO$_4$); by salts derived from weak bases, for example ammonium chloride (NH$_4$Cl), ammonium sulphate or ammonium phosphate; salts of aluminium acids ( aluminium sulphate, aluminium nitrate); or by acid solutions of oxides such as silicic acid. The anion of this acid is termed X.

The concentration of the selected acid is preferably one molar (1 M). This compound with an acid function is selected as a function of the nature of the aluminium source, i.e., the degree of hydrolysis of this source of aluminium, and of the desired pH.

The aluminas obtained are characterized by a nitrogen adsorption and desorption isotherm, an X ray diffraction diagram and a $^{27}$Al nuclear magnetic resonance (NMR)

spectrum with magic angle spinning. The nitrogen adsorption and desorption isotherm enables the specific surface area to be calculated using the BET method described in J. Am. Chem. Soc., 73, p. 373–380 (1951). A total pore volume can also be determined, also a pore volume for the pores in a representative range of the material being studied and an average pore diameter using the BJH method described in J. Am. Chem. Soc. 60 p. 309–319 (1938).

The $^{27}$Al aluminium nuclear magnetic resonance (NMR) with magic angle spinning spectrum enables the co-ordination of the aluminium in the structure to be discerned. The NMR spectra are obtained using an aqueous aluminium nitrate solution as the reference.

The X ray diffraction spectra enabled the interplanar spacing "d" of the synthesised compounds to be determined. The X ray diffractometer used was a Phillips PW 1130 and the nuclear magnetic resonance spectrometer was a Bruker DSX 400.

The following examples illustrate the invention without limiting its scope.

EXAMPLE 1

A solution A was obtained by dissolving 7.28 g of hexadecyltrimethylammonium bromide in 100 ml of water by heating it to 50° C. 4.2 g of sodium aluminate was then poured into that solution. A solution C was obtained by heating 50 ml of 1 M HCl to 50° C. Solution C was poured into solution A containing the aluminate all at once with vigorous stirring. The pH stabilised at about 10. The mixture was allowed to develop under vigorous stirring for 15 minutes at 50° C. The product obtained was filtered, washed with water and dried for 15 hours at 60° C. under atmospheric pressure.

1 g of this precursor was calcined in nitrogen: the temperature was gradually increased to 450 ° C. over a period of 3 hours then this temperature was maintained for 2 hours.

Figure 1C:
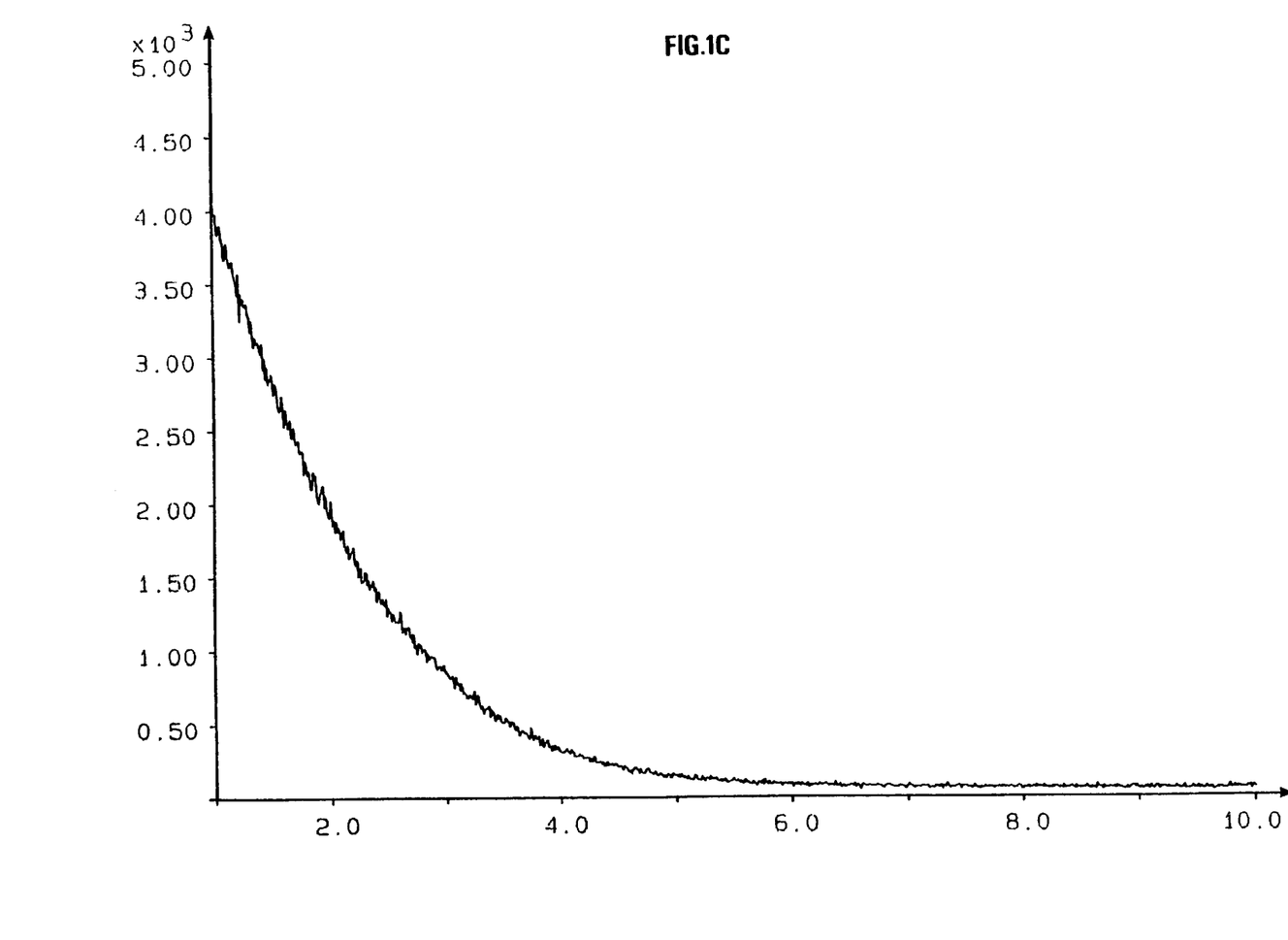
FIG. 1C is an X ray diffraction diagram at low value angles of the product of Example 1.
Figure 1D:
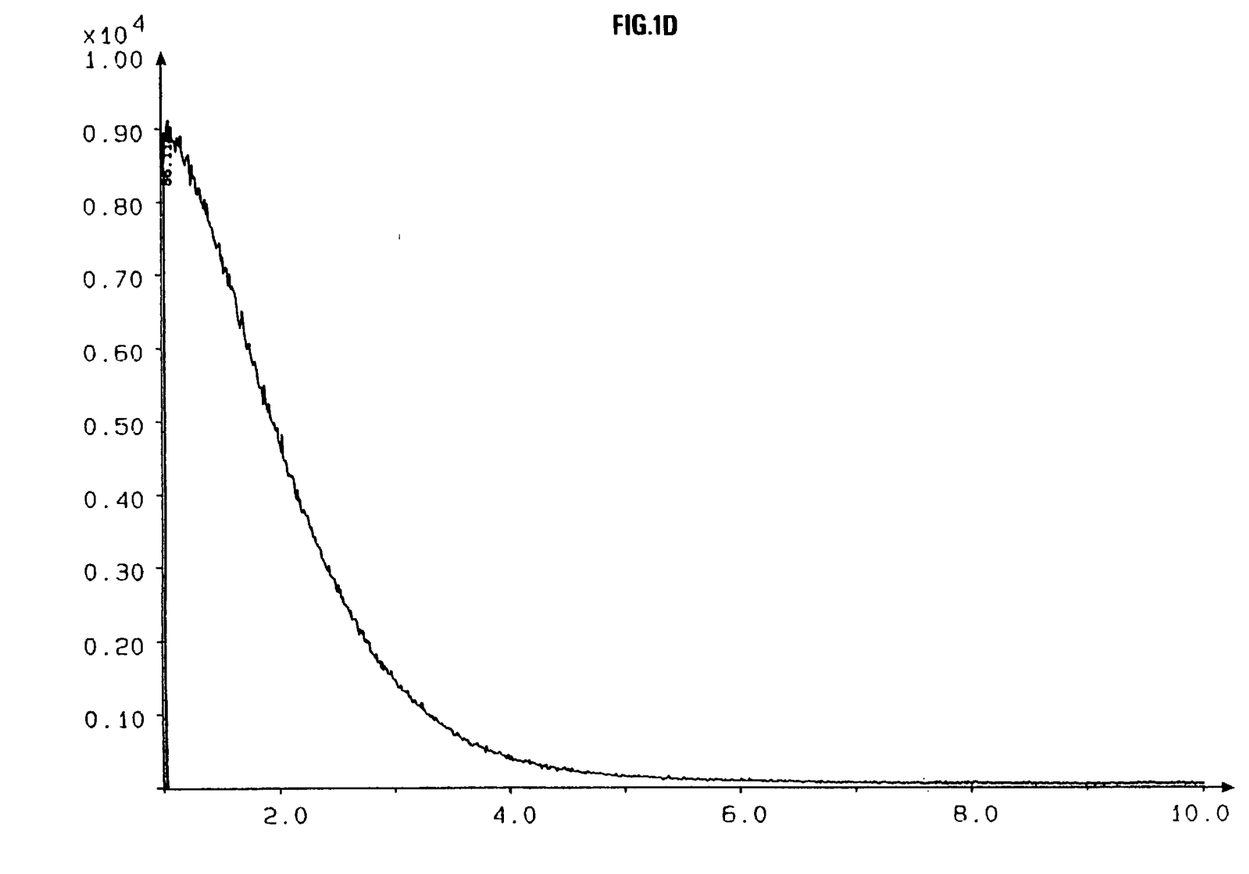
FIG. 1D is an X ray diffraction diagram of the product after calcining of Example 1.

No peak could be seen on the X ray diffraction diagram (FIG. 1c) at low value angles (2θ<5°), only a somewhat pronounced central diffusion could be seen; however, after calcining at 450° C. in nitrogen the peak appeared to be more distinct (FIG. 1d).

Figure 1E:
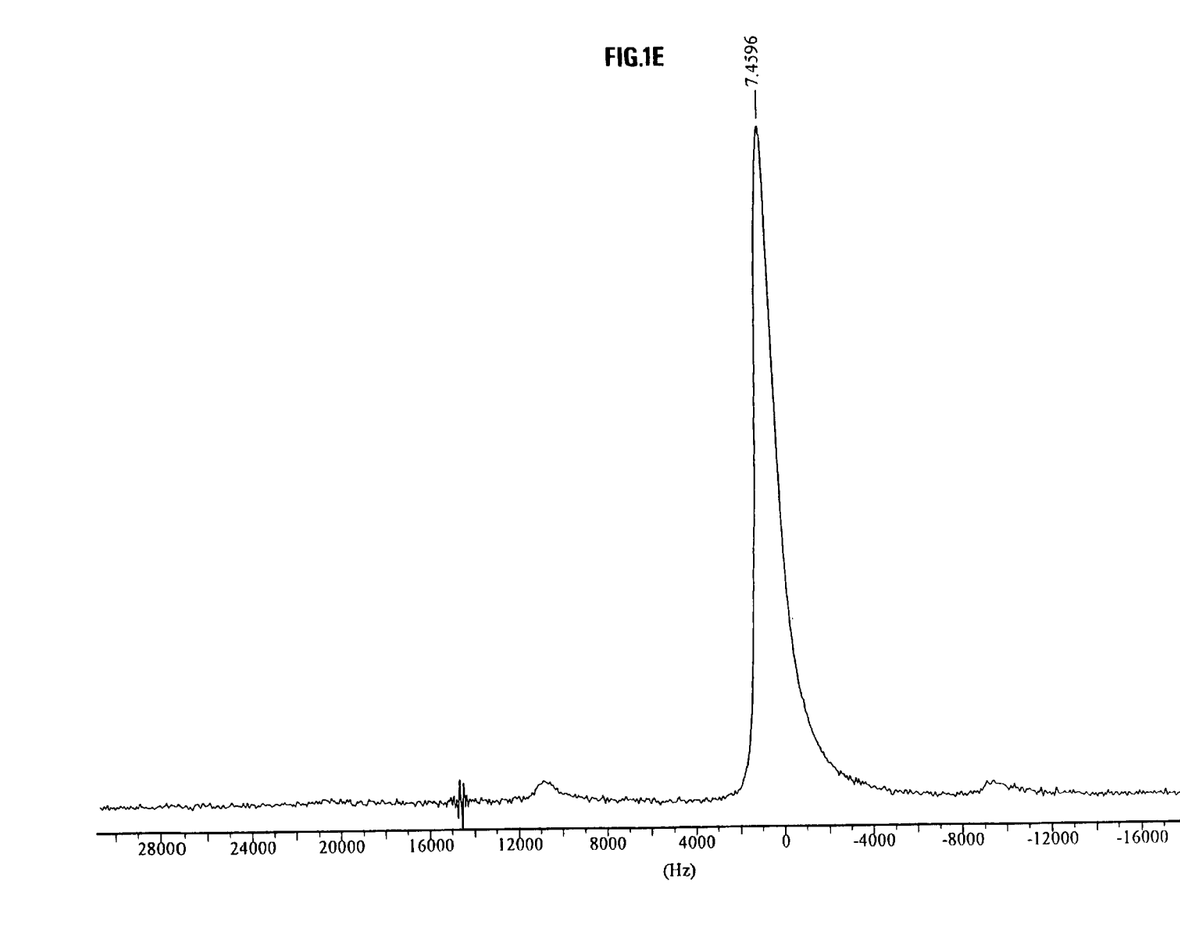
FIG. 1E is an NMR spectrum of the product of Example 1.
Figure 1F:
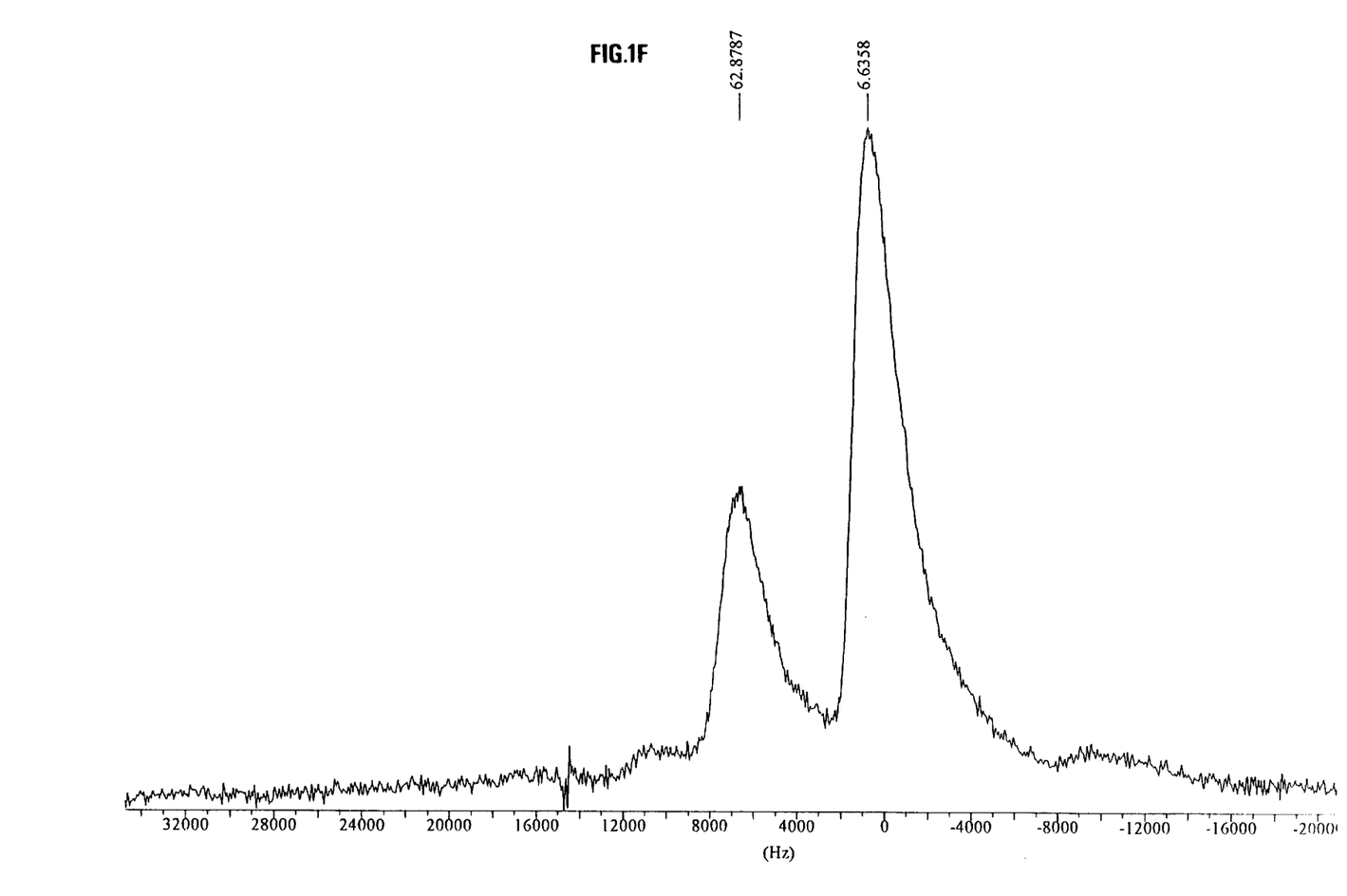
FIG. 1F is an NMR spectrum of the product after calcining of Example 1.

The NMR spectrum of the as synthesised material (FIG. 1e) had a peak located at 7.5 ppm which was characteristic of the presence of octahedral aluminium sites. The NMR spectrum of the material obtained after calcining (FIG. 1f) had two peaks, one situated at 62.9 ppm being characteristic of the presence of tetrahedral aluminium sites, the other situated at 6.6 ppm being characteristic of the presence of octahedral aluminium sites.

The specific surface area determined by the BET method, the total pore volume, the average pore diameter of pores with a diameter in the range 1.7 nm to 30 nm and the pore volume of pores with a diameter in the range 1.7 nm to 30 nm were determined from the nitrogen adsorption and desorption isotherms; these characteristics are shown in Table 1.

TABLE 1

| | |
|---|---|
| BET surface area | 548 m²/g |
| Total pore volume | 0.82 cm³/g |
| Average diameter of pores in the range 1.7 nm to 30 nm | 4.2 nm |
| Pore volume of pores in the range 1.7 nm to 30 nm | 0.80 cm³/g |

EXAMPLE 2

A solution B was obtained by dissolving 2.1 g of sodium aluminate in 10 ml of water by heating to 50° C. A solution A was obtained by dispersing 0.55 g of sodium palmitate in 25 ml of water by heating to 50° C., then adding 2.91 g of hexadecyltrimethylammonium bromide which had previously been dissolved in 15 ml of water by heating to 50° C. A solution C was obtained by heating 24 ml of 1 M HCl to 50° C. Solution A was poured into solution B with vigorous stirring, then solution C was added. The pH stabilised at about 10. The mixture was allowed to develop under vigorous stirring for 15 minutes at 50° C. The product obtained was filtered, washed with water and dried for 15 hours at 60° C. under atmospheric pressure. 1 g of this precursor was calcined in nitrogen: the temperature was gradually increased to 450° C. over a period of 3 hours then this temperature was maintained for 2 hours.

Figure 2C:
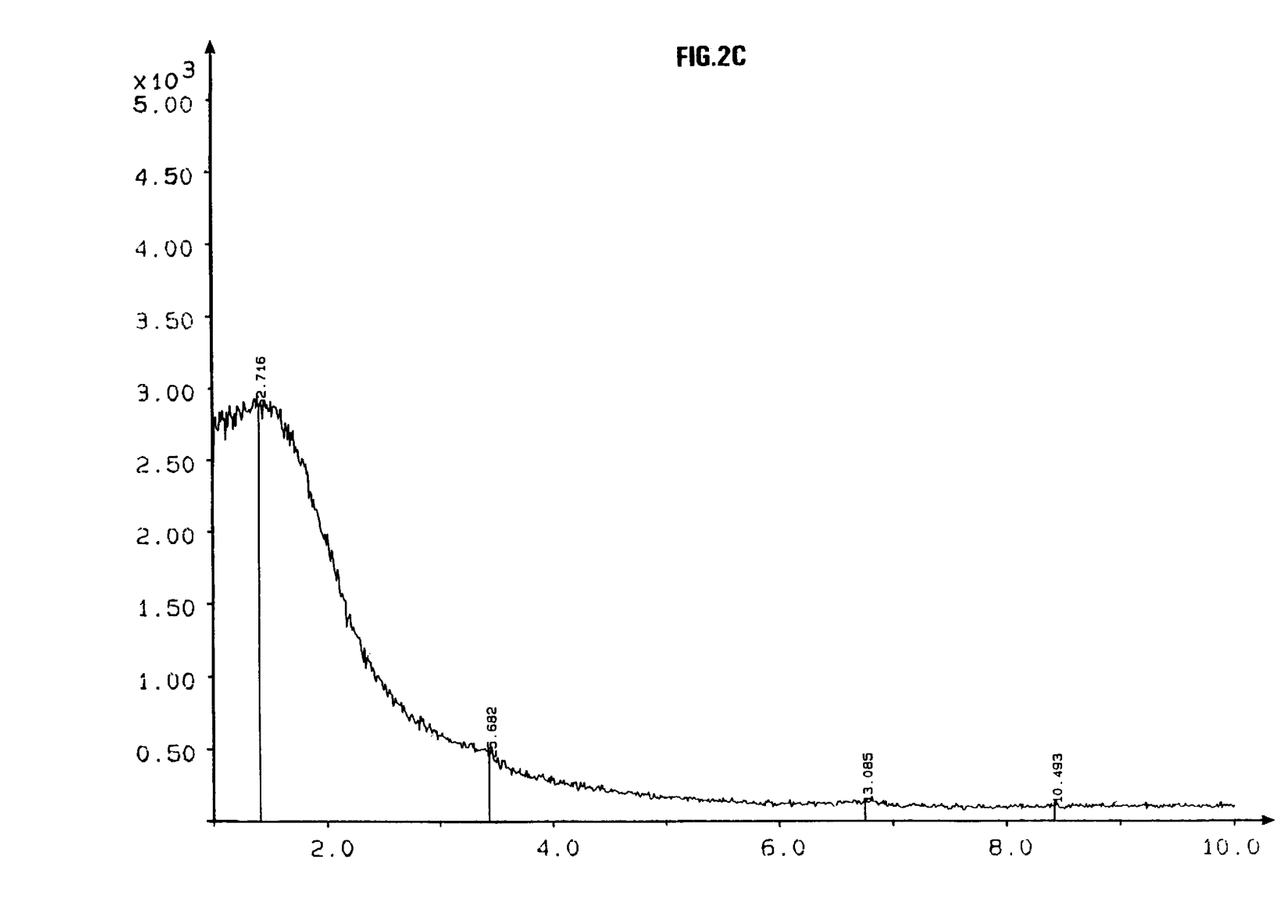
FIG. 2C is an X ray diffraction diagram of the product of Example 2.
Figure 2D:
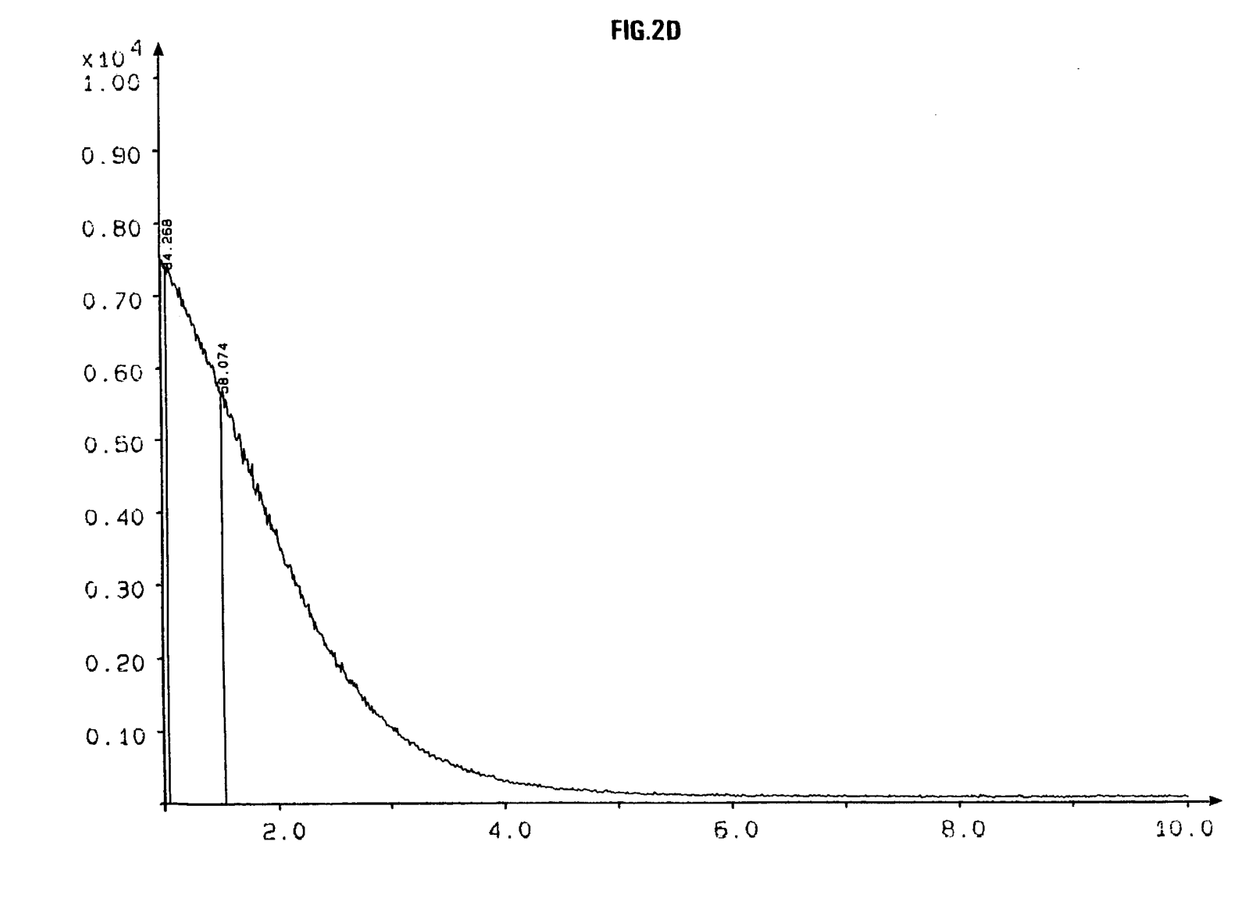
FIG. 2D is an X ray diffraction diagram of the product after calcining of Example 2.

A broad intense peak was seen on the X ray diffraction diagram (FIG. 2c) of the as synthesised compound, corresponding to an interplanar spacing d of 6.3 nm (62.7 Å). After calcining in nitrogen at 450° C., a displacement towards low angle values (2θ<1°) was observed, which resulted in the appearance of a strong central diffusion (FIG. 2d.)

Figure 2E:
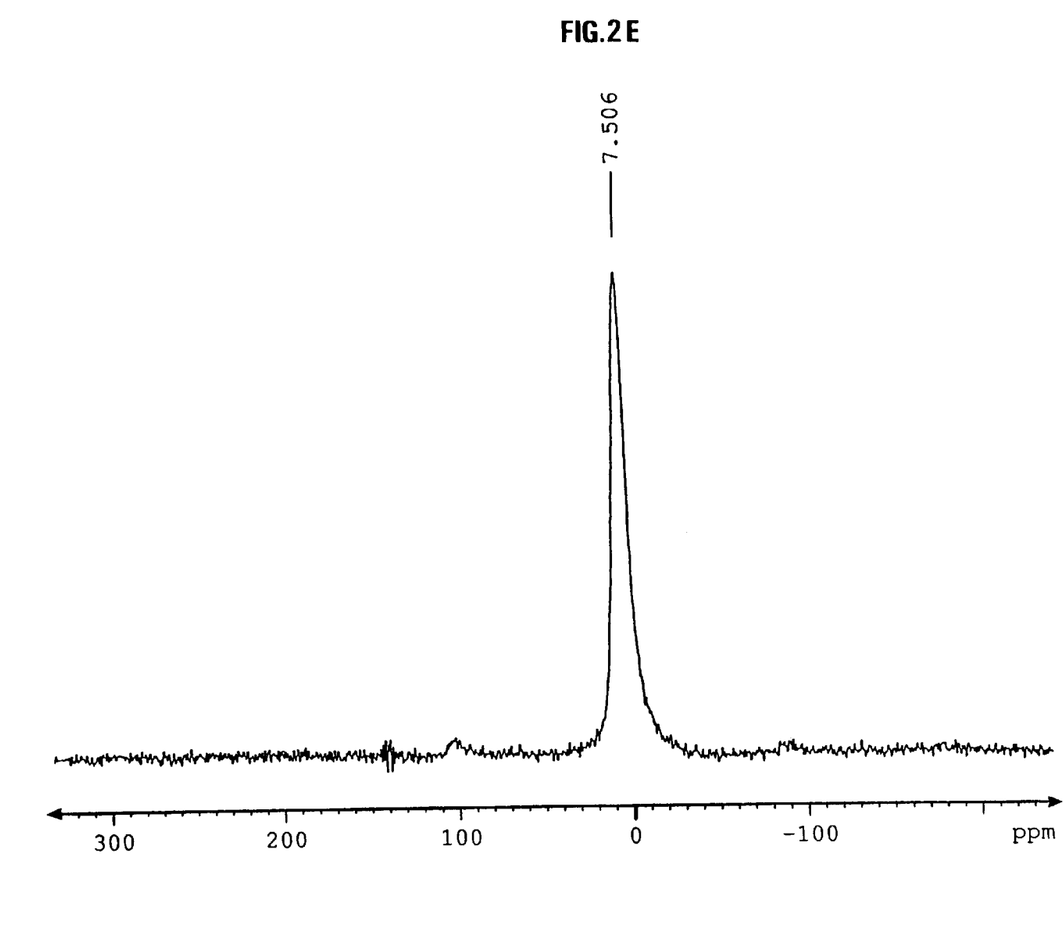
FIG. 2E is an NMR spectrum of the product of Example 2.
Figure 2F:
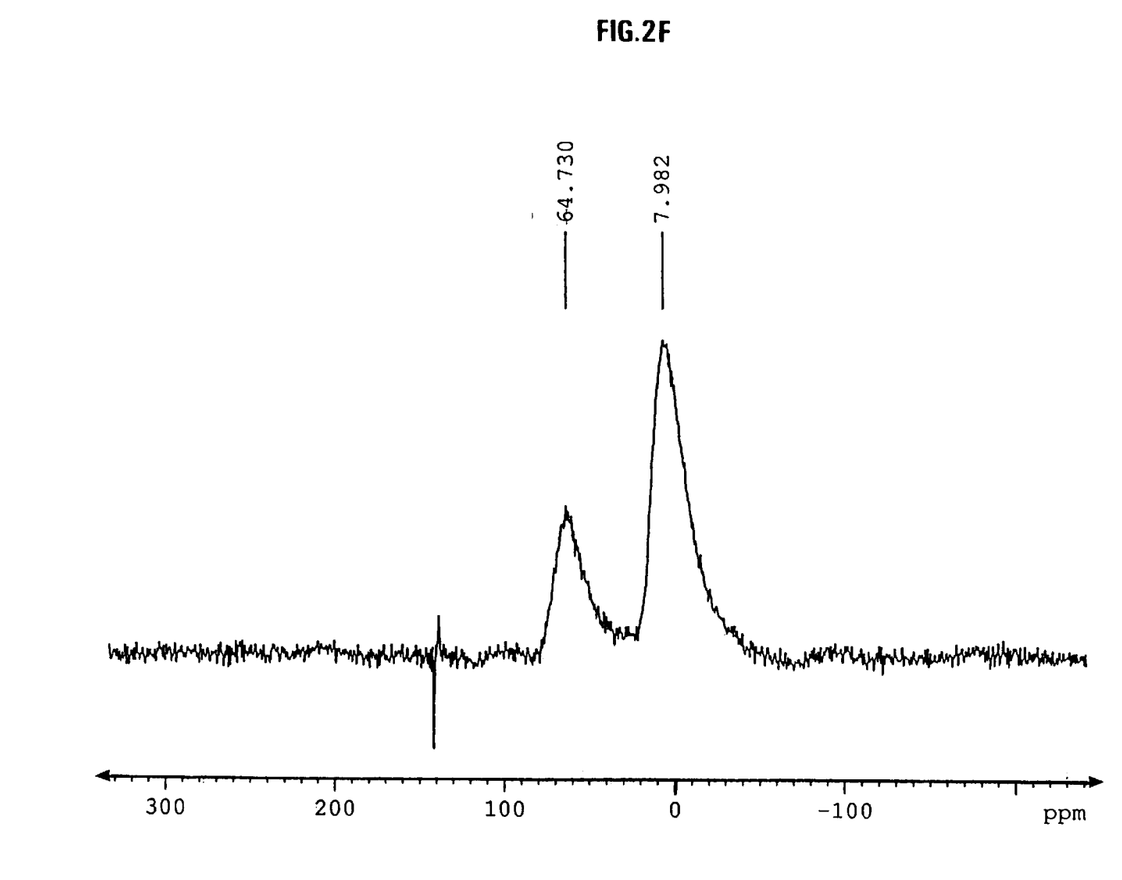
FIG. 2F is an NMR spectrum of the product after calcining of Example 2.

The NMR spectrum of the as synthesised material (FIG. 2e) had a peak located at 7.5 ppm which was characteristic of the presence of octahedral aluminium sites. The NMR spectrum of the material obtained after calcining (FIG. 2f) had two peaks, one situated at 64.7 ppm being characteristic of the presence of tetrahedral aluminium sites, the other situated at 8.0 ppm being characteristic of the presence of octahedral aluminium sites.

The specific surface area determined by the BET method, the total pore volume, the average pore diameter of pores with a diameter in the range 1.7 nm to 80 nm and the pore volume of pores with a diameter in the range 1.7 nm to 80 nm were determined from the nitrogen adsorption and desorption isotherms; these characteristics are shown in Table 2.

TABLE 2

| | |
|---|---|
| BET surface area | 400 m²/g |
| Total pore volume | 1.44 cm³/g |
| Average diameter of pores in the range 1.7 nm to 80 nm | 10 nm |
| Pore volume of pores in the range 1.7 nm to 80 nm | 1.42 cm³/g |

EXAMPLE 3

A solution A was obtained by dissolving 7.28 g of hexadecyltrimethylammonium bromide in 100 ml of water by heating to 50° C. 4.2 g of sodium aluminate was then poured into that solution. A solution C was obtained by heating 44 ml of 1 M HCl to 50° C. Solution C was poured into solution A containing the aluminate all at once with vigorous stirring. The pH stabilised at about 12. The mixture was allowed to develop under vigorous stirring for 15 minutes at 50° C. The product obtained was filtered, washed with water and dried for 15 hours at 60° C. under atmospheric pressure. 1 g of this precursor was calcined in nitrogen: the temperature was gradually increased to 450° C. over a period of 3 hours then this temperature was maintained for 2 hours.

Figure 3C:
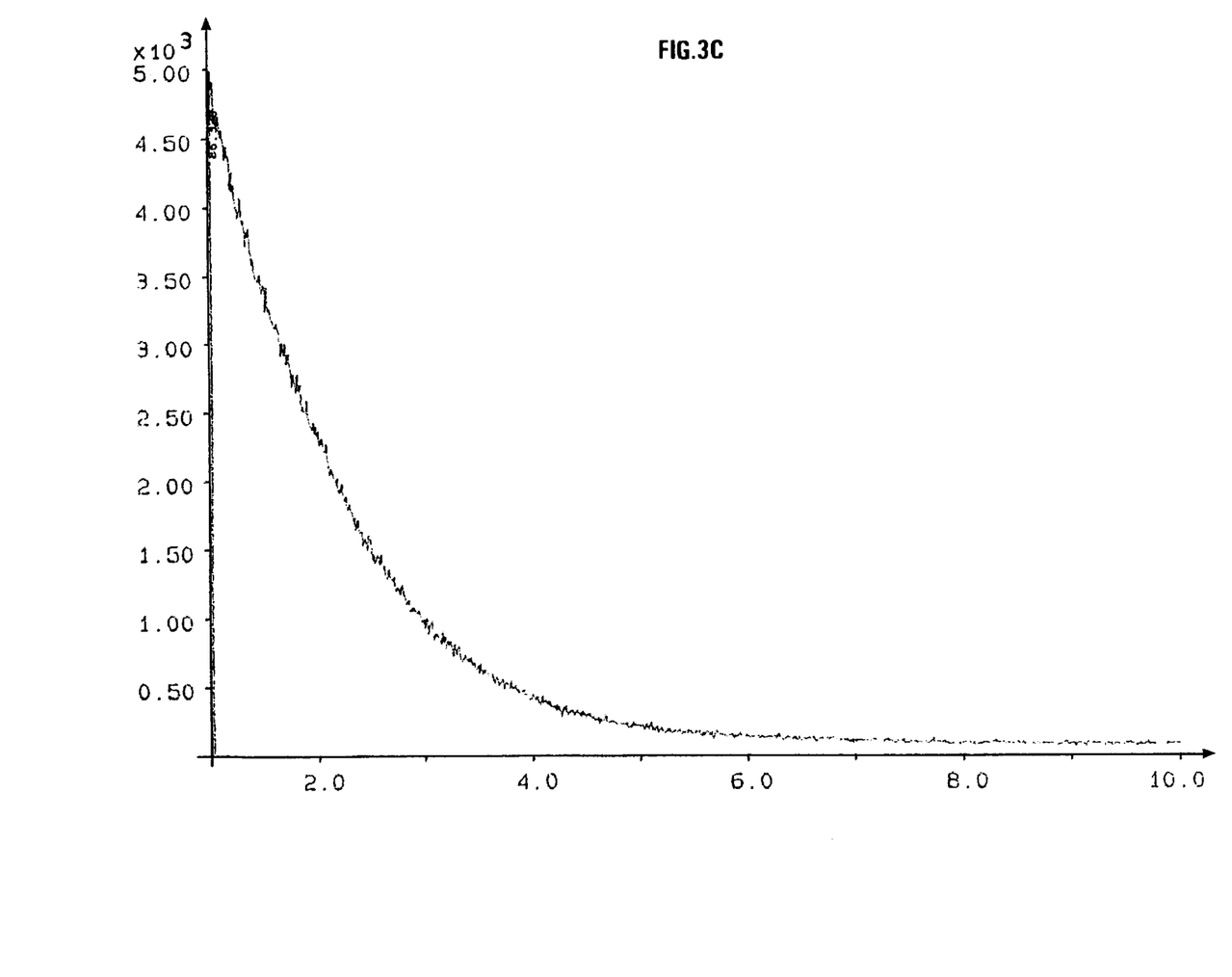
FIG. 3C is an X ray diffraction diagram at low value angles of the product of Example 3.
Figure 3D:
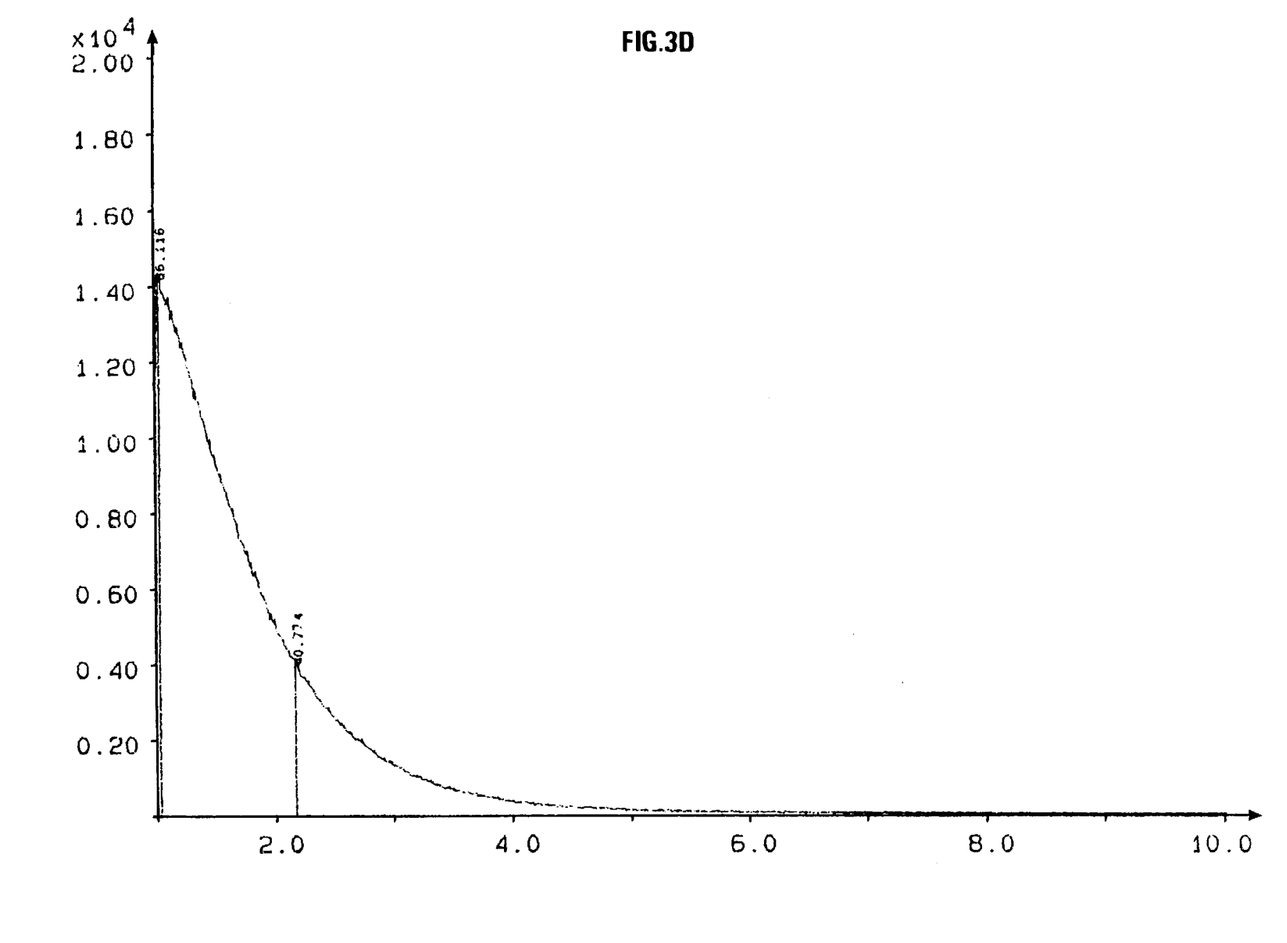
FIG. 3D is an X ray diffraction diagram of the product after calcining of Example 3.

No peak could be seen on the X ray diffraction diagram (FIG. 3c) at low value angles (2θ<5°), only a somewhat pronounced central diffusion could be seen; however, after calcining at 450° C. in nitrogen the peak appeared to be more distinct (FIG. 3d).

Figure 3E:
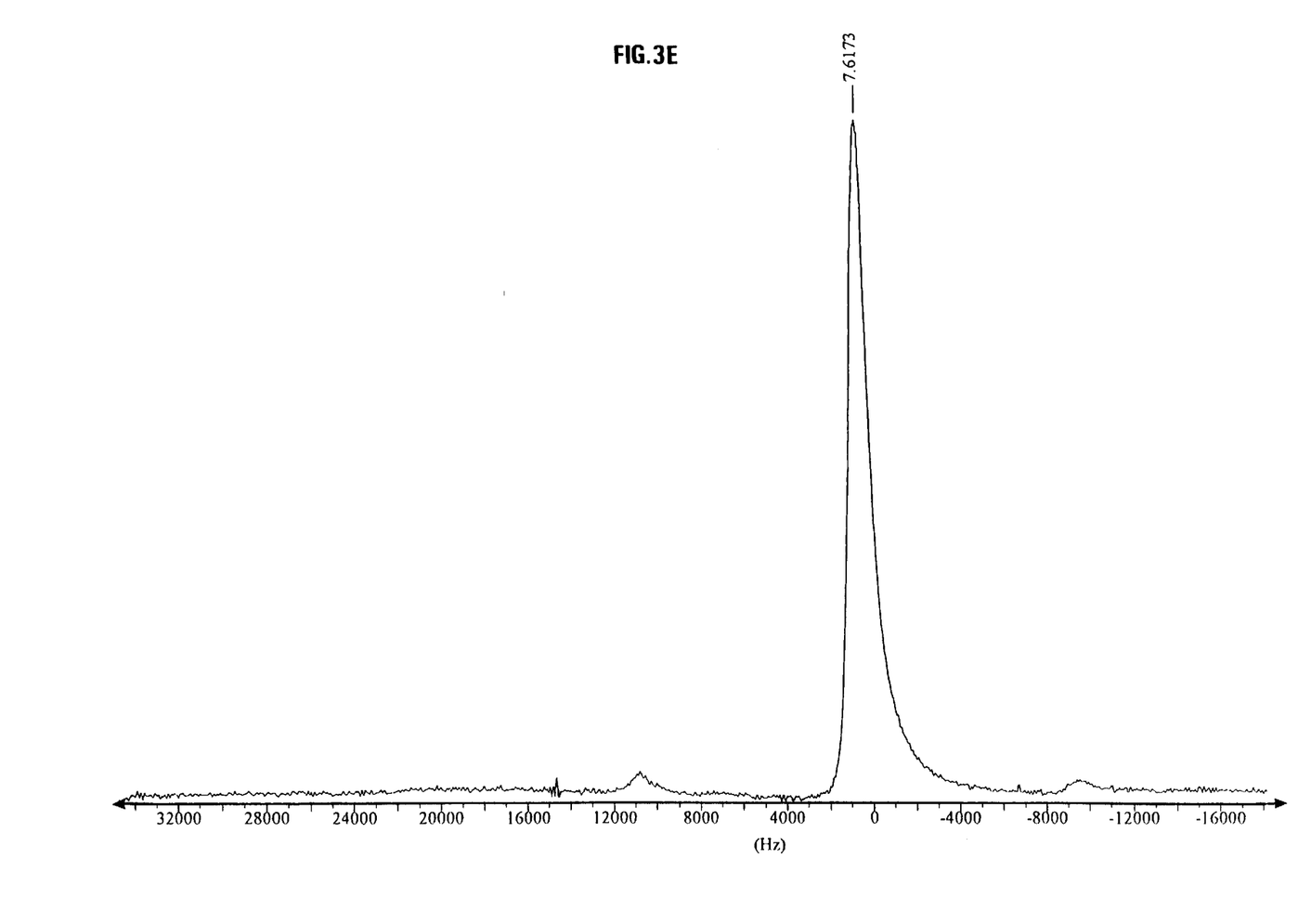
FIG. 3E is an NMR spectrum of the product of Example 3.
Figure 3F:
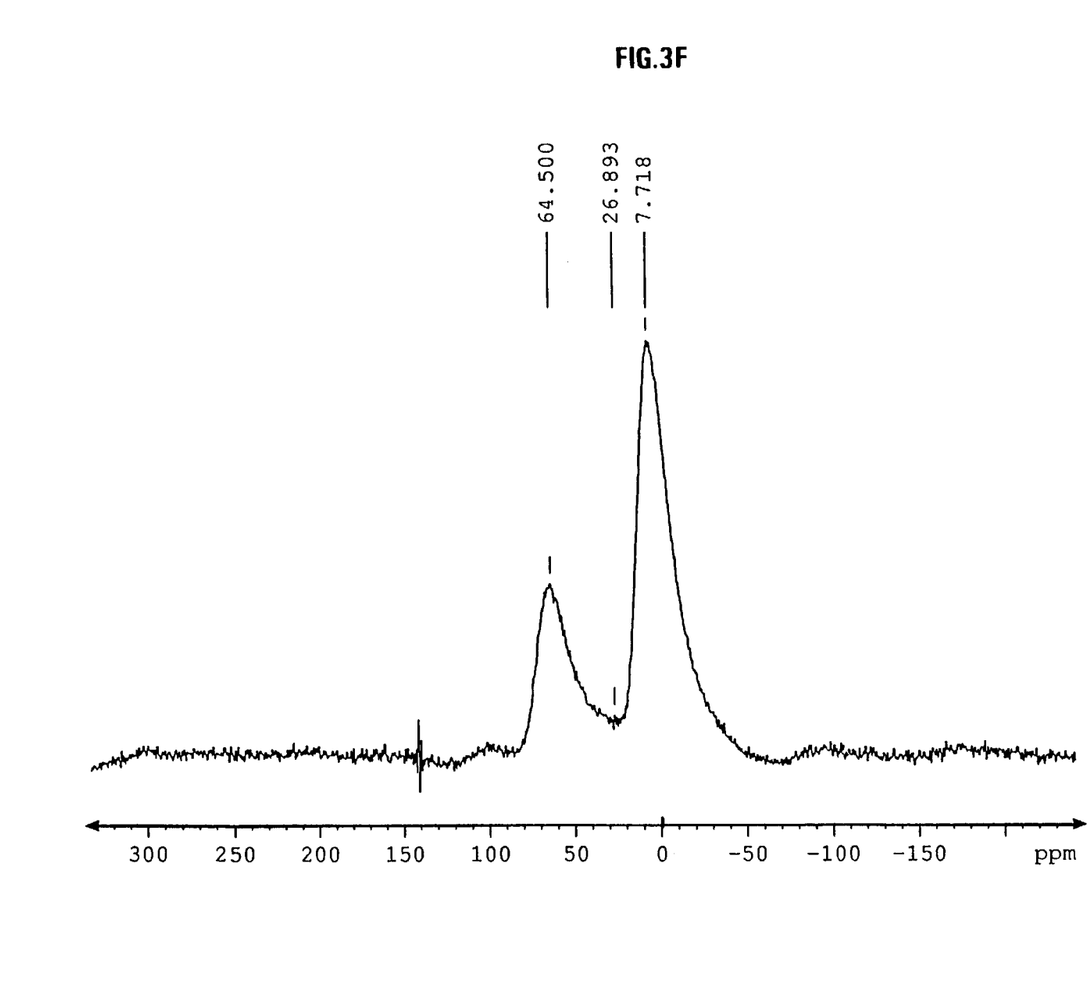
FIG. 3F is an NMR spectrum of the product after calcining of Example 3.

The NMR spectrum of the as synthesised material (FIG. 3e) had a peak located at 7.6 ppm which was characteristic of the presence of octahedral aluminium sites. The NMR spectrum of the material obtained after calcining (FIG. 3f) essentially had two peaks, one situated at 7.7 ppm being characteristic of the presence of octahedral aluminium sites, the other situated at 64.5 ppm being characteristic of the presence of tetrahedral aluminium sites.

The specific surface area determined by the BET method, the total pore volume, the average pore diameter of pores with a diameter in the range 1.7 nm to 20 nm and the pore volume of pores with a diameter in the range 1.7 nm to 20 nm were determined from the nitrogen adsorption and desorption isotherms; these characteristics are shown in Table 3.

TABLE 3

| | |
|---|---|
| BET surface area | 403 m$^2$/g |
| Total pore volume | 0.53 cm$^3$/g |
| Average diameter of pores in the range 1.7 nm to 20 nm | 3.8 nm |
| Pore volume of pores in the range 1.7 nm to 20 nm | 0.51 cm$^3$/g |

EXAMPLE 4

A solution B was obtained by dissolving 4.2 g of sodium aluminate in 20 ml of water by heating to 50° C. A solution A was obtained by dispersing 1.11 g of sodium palmitate in 50 ml of water by heating to 50° C, then adding 5.83 g of hexadecyltrimethylammonium bromide which had previously been dissolved in 30 ml of water by heating to 50° C. A solution C was obtained by heating 45 ml of 1 M HCl to 50° C. Solution A was poured into solution B with vigorous stirring, then solution C was added. The pH stabilised at about 12. The mixture was allowed to develop under vigorous stirring for 15 minutes at 50° C. The product obtained was filtered, washed with water and dried for 15 hours at 60° C. under atmospheric pressure. 1 g of this precursor was calcined in nitrogen: the temperature was gradually increased to 450?C. over a period of 3 hours then this temperature was maintained for 2 hours.

Figure 4C:
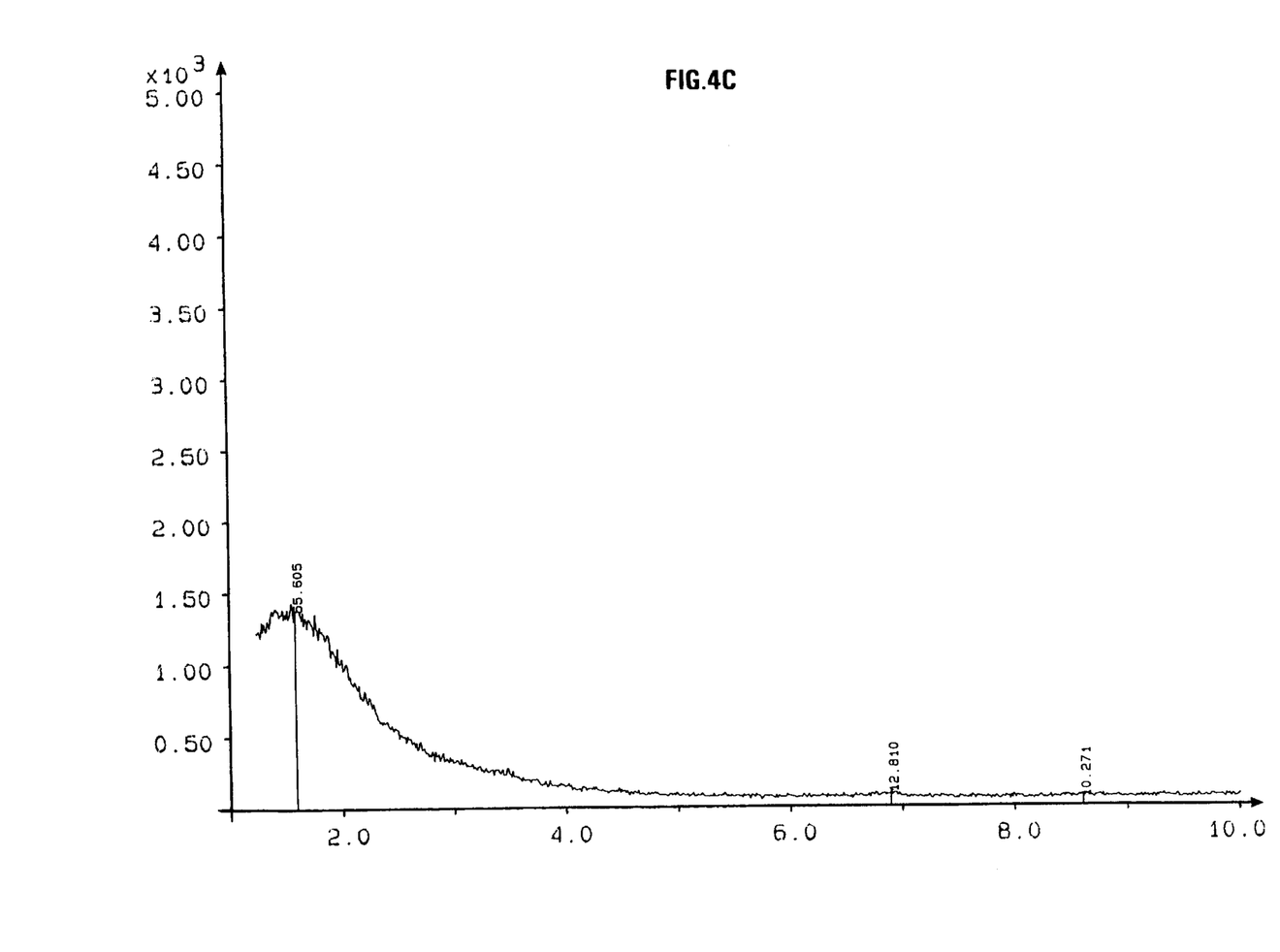
FIG. 4C is an X ray diffraction diagram of the product of Example 4.
Figure 4D:
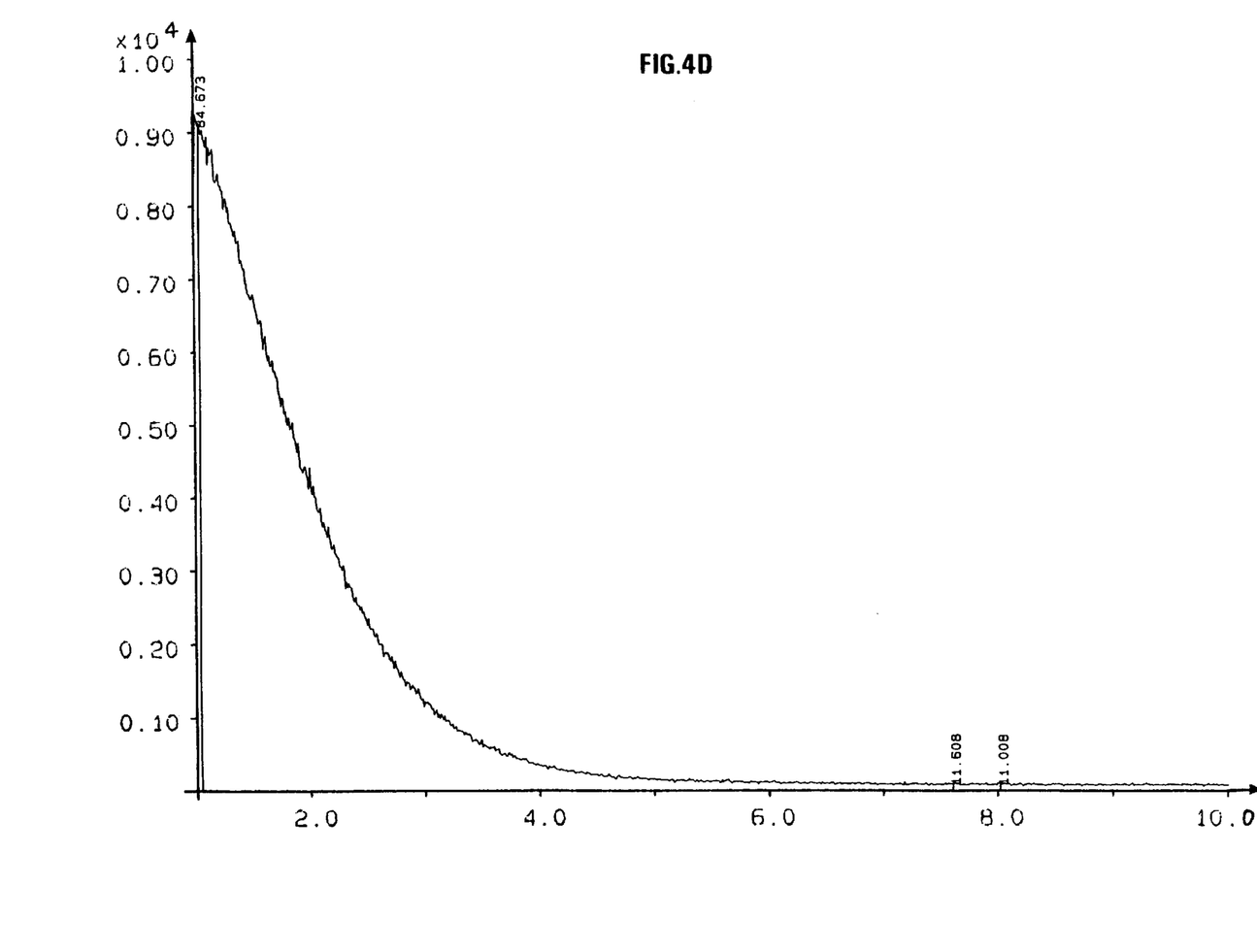
FIG. 4D is an X ray diffraction diagram of the product after calcining of Example 4.

A broad intense peak was seen on the X ray diffraction diagram (FIG. 4c) of the as synthesised compound, corresponding to an interplanar spacing d of 6.6 nm (65.6 Å). After calcining in nitrogen at 450° C., a displacement towards low angle values (2θ<1°) was observed, which resulted in the appearance of a strong central diffusion (FIG. 4d).

The specific surface area determined by the BET method, the total pore volume, the average pore diameter of pores with a diameter in the range 1.7 nm to 40 nm and the pore volume of pores with a diameter in the range 1.7 nm to 40 nm were determined from the nitrogen adsorption and desorption isotherms; these characteristics are shown in Table 4.

TABLE 4

| | |
|---|---|
| BET surface area | 440 m$^2$/g |
| Total pore volume | 1.29 cm$^3$/g |
| Average diameter of pores in the range 1.7 nm to 40 nm | 8.1 nm |
| Pore volume of pores in the range 1.7 nm to 40 nm | 1.28 cm$^3$/g |

What is claimed is:

1. A process for synthesizing an alumina with a controlled porosity carried out in an aqueous medium, comprising:
    a) preparing a precursor of said alumina by hydrolysis of at least one anionic inorganic aluminum source in the presence of at least one surfactant so as to form a precipitate, wherein said hydrolysis is carried out in an aqueous solvent medium the pH of which is higher than the isoelectric point of the alumina; and wherein said at least one surfactant comprises at least one cationic surfactant selected from the group consisting of an alkylammonium salt, an alkylphosphonium salt and an alkylsulphonium salt;
    b) drying the resultant precipitate in air at a temperature of about 40° C. to 110° C. for a period of about 2 to 30 hours; and
    c) calcining said dried precipitate at a temperature sufficient to eliminate the surfactant(s) present in the precursor.

2. A process according to claim 1, wherein said anionic inorganic aluminum source is an alkali metal aluminate.

3. A process according to claim 2, wherein said alkali metal aluminate is sodium aluminate.

4. A process for synthesizing alumina in an aqueous medium according to claim 1, wherein step a) is carried out in the presence of at least one organic compound representing about 0.001% to 20% by weight of the total solvent weight.

5. A process for synthesizing alumina in an aqueous medium according to claim 4, wherein the at least one organic compound is selected from the group consisting of an alkane containing 5 to 20 carbon atoms per molecule, an aromatic hydrocarbon substituted by one or more hydrocarbon groups and an aliphatic alcohol containing 5 to 20 carbon atoms per molecule.

6. A process for synthesizing an alumina with a controlled porosity carried out in an aqueous medium, comprising:
    a) preparing a precursor of said alumina by hydrolysis of at least one anionic inorganic aluminum source in the presence of at least one surfactant so as to form a precipitate, wherein said hydrolysis is carried out in an aqueous solvent medium the pH of which is higher than the isoelectric point of the alumina, and wherein said at least one surfactant comprises at least one anionic surfactant selected from the group consisting of an alkylcarboxylate, an alkylsulphate, an alkylsulphonate, an alkylphenylsulphonate, an alkylphosphate and an alkylphosphonate;
    b) drying the resultant precipitate in air at a temperature of about 40° C. to 110° C. for a period of about 2 to 30 hours; and
    c) calcining said dried precipitate at a temperature sufficient to eliminate the surfactant(s) present in the precursor.

7. A process according to claim 6, wherein the quantity of said anionic surfactant(s) is such that the total charge of all surfactants does not become negative, and wherein the inorganic aluminum source has a surface charge which remains negative.

8. A process for synthesizing an alumina with a controlled porosity carried out in an aqueous medium, comprising:
    a) preparing a precursor of said alumina by hydrolysis of at least one anionic inorganic aluminum source in the presence of at least one surfactant so as to form a precipitate, wherein said hydrolysis is carried out in an aqueous solvent medium the pH of which is higher than the isoelectric point of the alumina; and wherein said at least one surfactant comprise at least one non ionic surfactant selected from the group consisting of an alkylpolyethylene oxide, an alkylphenylpolyethylene oxide, an alkylphosphine oxide and an alkylamine oxide;
    b) drying the resultant precipitate in air at a temperature of about 40° C. to 110° C. for a period of about 2 to 30 hours; and
    c) calcining said dried precipitate at a temperature sufficient to eliminate the molecules of surfactants present in the precursor.

* * * * *